Patented Aug. 26, 1952

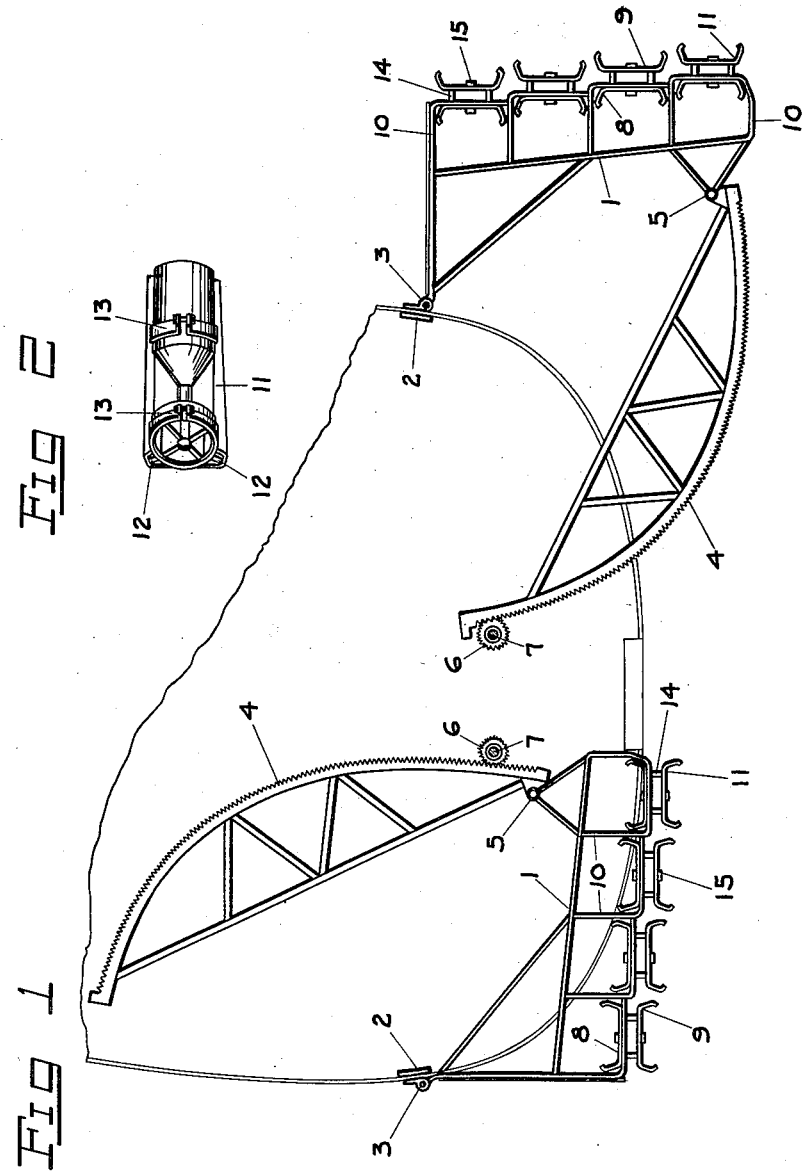

2,608,132

UNITED STATES PATENT OFFICE 2,608,132

ROCKET LAUNCHER FOR RETRO-BOMBING APPARATUS

Charles C. Lauritsen, Pasadena, Calif., assignor to the United States of America as represented by the Secretary of the Navy Application September 17, 1945, Serial No. 616,912

1 Claim. (Cl. 89—1.7)

This invention relates to a rocket bomb launching device and more particularly to a rocket firing retro-bombing apparatus for aircraft.

In the adaptation of aircraft to the use of rocket bombs, structural changes are frequently required. Such changes usually involve much labor, the grounding of the aircraft for a considerable period of time, and at least minor redesigning of the fuselage or wings. The bombing apparatus incorporated in the aircraft frequently interferes with bomb carrying capacity, radar equipment, protective armament or other functional parts of a modern fighting aircraft. Reloading in flight is usually impossible. Conventional rocket bomb launching devices provide forward launching necessitating relatively complicated aiming mechanisms.

Objects of my invention, therefore, are to provide an apparatus designed to launch rocket propelled bombs rearwardly from an aircraft at a velocity calculated to compensate for forward travel of the aircraft in order that bombs may fall substantially vertically in space, in a trajectory having little or no horizontal component; to provide a rocket firing retro-bombing apparatus of simple character easily and quickly installed; to provide a rocket firing retro-bombing apparatus incorporated in, or substituted for, the conventional bomb-bay doors of an airplane; to provide a retro-bombing apparatus having a plurality of rocket bomb launching tracks, at least some of which may be reloaded from within the airplane while in flight; to provide a retro-bombing apparatus arranged so that it does not interfere with the conventional bomb carrying apparatus; to provide a rearwardly directed rocket bomb launching apparatus for aircraft, which moves from an initially horizontal, retracted position to a vertical, launching position wherein the launching tracks are on edge; to accomplish the noted objects in a facile and economically efficient manner; and to provide improved elements and arrangements thereof in a rocket firing retro-bombing apparatus of the character and for the purposes set forth.

In accomplishing these and other objects of the present invention, I have provided improved details of structure, the preferred form of which is illustrated in the accompanying drawing, wherein:

Fig. 1 is a view indicating a portion of the fuselage of an aircraft of bomber type in end elevation at the conventional bomb-bay door openings of the aircraft, the apparatus embodying my invention being shown in association therewith, a part thereof being retracted to a nearly closed position and another part being extended to pendent position for retro-rocket bomb launching.

Fig. 2 is an isometric view of a conventional rocket bomb, its retaining bands and guide lugs positioned in a launching track.

Referring more in detail to the drawing:

The retro-rocket bomb launching apparatus embodying this invention preferably consists of support frames 1 pivotally supported by longerons 2 at the outer margins of a bomb-bay opening by means of support hinges 3.

A plurality of segmental rack gears 4 are pivotally connected to the support frames 1 at their inner and lower extremities 5 and are controllably engaged by pinion gears 6. All of the pinion gears 6 operating one launching rack are driven in unison by a common rotatable shaft 7 located within the bomb-bay. The shaft 7 is that used for operating or opening and closing conventional bomb-bay doors and the power therefor requires little or no modification.

Inner sets of longitudinal rocket launching tracks 8 and outer sets of longitudinal rocket launching tracks 9 are rigidly secured to the support frames 1 by clearance arms 10 passed between the adjacent launching tracks 8 to support tracks 8 and 9 and provide clearance for the passage of rocket bombs between the inner launching tracks 8 and support frames 1.

Said inner and outer launching track sets consist of a multiplicity of substantially channel shaped launching tracks 8 and 9, the tracks in each set being positioned edge to edge and having inwardly projecting longitudinal lips 11 to embrace guide lugs 12 projecting from the rocket bomb retaining bands 13 shown in Fig. 2, presently more fully described. The two sets are maintained in spaced back-to-back relationship by spacers 14 that are suitably secured to the tracks, as by bolting.

Retaining bands 13 bearing thereon guide lugs 12 are provided as shown in Fig. 2; one clamped to the rocket bomb body and another to the bomb tail ring. The guide lugs 12 cooperatively engage in slidable relationship the channel-like grooves formed by the juncture of the longitudinal lips 11 and the launching tracks 8 and 9.

The launching tracks are adapted to receive, support and guide rocket bombs of conventional type. The tracks are more fully disclosed in patent application, Serial Number 481,649 (OEMsr-418-7, Navy 3553); no claim being made in this instance to the disclosure of said application.

The spring contact means 15 shown in Fig. 1 are provided in the leading ends of the launching tracks 8 and 9 to perform dual functions; to engage the rocket bomb tail ring to maintain the rocket bomb in the rack during flight and to serve as electrical contacts for conventional electric ignition means incorporated in the rocket motor.

When the launching apparatus is in its retracted position, as shown to the left in Fig. 1, the launching sets are disposed substantially horizontally across the bottom of the bomb-bay. The launching tracks 9 of the outer set face downwardly, while the launching tracks 8 of the inner set face upwardly into the bomb-bay, as shown in the retracted launching apparatus in Fig. 1. Thus, the inner set of launching tracks may be reloaded from within the bomb-bay.

When the apparatus is projected to an extended position as shown in the right hand portion of Fig. 1, the sets are disposed substantially vertically, with the launching tracks 8 and 9 on edge directed rearwardly relative to the aircraft so that the rockets, in discharging rearwardly from the launching tracks, clear the fuselage.

Operation

The operation of a rocket bomb launching apparatus constructed as described is as follows:

The outer launching tracks 9, being disposed outside the bomb-bay, must be loaded prior to the take-off of the aircraft. The inner tracks 8 may be loaded before take-off, or, being disposed inside the bomb-bay, when the launching device is retracted, may be loaded and reloaded during flight.

The rocket bombs with securely fastened retaining bands 13, as shown in Fig. 2, are guided into the racks aft end first so that the guide lugs 12 are guided and supported by the lips 11 and the launching tracks 8 and 9 a distance properly to engage the tail ring of the rocket bomb with the spring contact means 15.

During take-off and ordinary flight of the aircraft, the launching device is maintained in a retracted position to reduce wind resistance.

When a bombing area is approached, the right pinion gear 6 and shaft 7, as viewed in Fig. 1, are rotated clockwise and the left pinion gear 6 and shaft 7 are rotated counter-clockwise to engage the segmental gears 4 and extend the launching apparatus to rocket bomb firing position.

The aircraft is flown at a predetermined bombing speed. All the rocket bombs are fired simultaneously by electrical current transmitted through contacts 15. The rocket motors are designed to impart a rearward velocity to the rocket bomb, relative to the aircraft, approximating the forward velocity of the aircraft. As a consequence, the rockets do not travel horizontally any appreciable distance, but fall substantially in a vertical path from the point of discharge.

After firing, the launching apparatus is retracted for the reloading of launching tracks 8 from within the bomb-bay.

Use of the instant launching apparatus on aircraft reveals several distinct advantages over prior known bomb launching apparatus. The rocket firing retro-bombing apparatus can be installed quickly and easily; no major structural changes in the aircraft are required; there is no interference with the normal operation of the radar, or any protective armament; the front bomb-bays are permitted to carry full size gas tanks; the capacity of the rear bomb-bay for standard bombs or mines is only slightly reduced; there is no interference with conventional bombing; there is negligible change in center of gravity; the spaces between the fuselage and the engine nacelles are left clear for externally carried bombs; reloading in flight is practicable; any desired lateral spacing of the bomb pattern is permitted; and the retro-bomb firing is found to be conductive to good accuracy in the placing of the bomb pattern.

While I have shown but one embodiment of my invention, it is apparent that the device is susceptible to modification without departing from the spirt of the invention. I do not wish, therefore, to be limited by the disclosure set forth, but only by the scope of the appended claim.

I claim:

The combination with a bomb carrying airplane fuselage having an opening located in the outboard portion of the bottom and adjacent lower side portion of the bomb-bay, of a rocket launcher structure comprising: end frames at the forward and rearward extremities of said opening rotatable about a common axis located along the margin of the opening at the side of the bomb-bay; a first set of launcher tracks carried by said end frames and facing into said bomb-bay; a second set of launcher tracks also carried by said end frames and facing outwardly; the launcher tracks of said sets extending longitudinally with respect to said fuselage, and movable by said end frames between a retracted position in approximate conformity with the fuselage to an extended position, wherein said launcher tracks are laterally offset from and clear said fuselage.

CHARLES C. LAURITSEN.

REFERENCES CITED

The following references are of record in the file of this patent:

UNITED STATES PATENTS

| Number | Name | Date |
|---|---|---|
| 1,558,542 | Holland | Oct. 27, 1925 |
| 1,621,654 | Boos | Mar. 22, 1927 |
| 1,636,451 | Andrus | July 19, 1927 |
| 2,193,139 | Monteith | Mar. 12, 1940 |
| 2,250,240 | Steuerlein | July 22, 1941 |
| 2,398,871 | Turnbull et al. | Apr. 23, 1946 |
| 2,409,210 | Jolly | Oct. 15, 1946 |
| 2,414,579 | Anderson et al. | Jan. 21, 1947 |
| 2,429,021 | Gould et al. | Oct. 14, 1947 |
| 2,470,120 | Walker | May 17, 1949 |
| 2,550,072 | Lindvall | Apr. 24, 1951 |

FOREIGN PATENTS

| Number | Country | Date |
|---|---|---|
| 428,934 | Great Britain | May 15, 1935 |
| 832,464 | France | July 4, 1938 |